United States Patent
Sakizchi et al.

(10) Patent No.: US 12,535,142 B2
(45) Date of Patent: Jan. 27, 2026

(54) FLOW CONTROL VALVE

(71) Applicants: Vadim Mikhailovich Sakizchi, Moscow (RU); Snezhana Valerievna Sobolevskaya, Moscow (RU)

(72) Inventors: Vadim Mikhailovich Sakizchi, Moscow (RU); Snezhana Valerievna Sobolevskaya, Moscow (RU)

( * ) Notice: Subject to any disclaimer, the term of this patent is extended or adjusted under 35 U.S.C. 154(b) by 0 days.

(21) Appl. No.: 18/761,108

(22) Filed: Jul. 1, 2024

(65) Prior Publication Data
US 2025/0020220 A1 Jan. 16, 2025

(30) Foreign Application Priority Data
Jul. 12, 2023 (RU) .......................... RU2023118418

(51) Int. Cl.
| | |
|---|---|
| F16K 3/12 | (2006.01) |
| F16K 3/02 | (2006.01) |
| F16K 3/03 | (2006.01) |
| F16K 17/20 | (2006.01) |
| F16K 47/08 | (2006.01) |

(52) U.S. Cl.
CPC .............. F16K 3/12 (2013.01); F16K 3/0209 (2013.01); F16K 3/029 (2013.01); F16K 3/03 (2013.01); F16K 17/20 (2013.01); F16K 47/08 (2013.01)

(58) Field of Classification Search
CPC .......... F16K 3/12; F16K 3/0209; F16K 3/029; F16K 3/03; F16K 17/20; F16K 47/08
See application file for complete search history.

(56) References Cited

U.S. PATENT DOCUMENTS

| | | | | |
|---|---|---|---|---|
| 1,999,699 A | * | 4/1935 | Koch ..................... | E21B 33/06 251/1.3 |
| 2,132,037 A | * | 10/1938 | Macclatchie ......... | E21B 33/062 92/61 |
| 2,333,423 A | * | 11/1943 | Hufferd ................... | F16L 37/16 137/614.04 |
| 3,084,898 A | * | 4/1963 | Miller .................... | F16K 31/122 166/321 |
| 3,136,525 A | * | 6/1964 | Creasser ............... | F16K 3/0209 251/212 |

(Continued)

FOREIGN PATENT DOCUMENTS

KR 20050014360 A * 2/2005 ............... F16K 3/03

*Primary Examiner* — John Bastianelli
(74) *Attorney, Agent, or Firm* — Muncy, Geissler, Olds & Lowe, P.C.

(57) ABSTRACT

A flow control valve contains an actuator and a housing with a control element having inlet and outlet nozzles with through openings of the same diameter and a central part located coaxial therewith between the nozzles with radially directed, longitudinally oriented throttling elements evenly located on its inner cylindrical surface: fixed ones each having the shape of a triangular tooth in cross-section, and movable throttling elements located between them, made to change the size of the through opening of the central part. All throttling elements have a terminal part in the form of a triangular wedge with a vertex angle size of 360/n, where n is the number of movable throttling elements, the cross-sectional area of the throttling elements in the "open" position of the regulator, has a deviation from the cross-sectional area of the flow part of any of the nozzles of no more than 2%.

1 Claim, 4 Drawing Sheets

(56) References Cited

U.S. PATENT DOCUMENTS

| | | | | |
|---|---|---|---|---|
| 5,524,863 | A * | 6/1996 | Davis | B08B 9/00 |
| | | | | 251/127 |
| 5,680,889 | A * | 10/1997 | Boger | F16K 5/12 |
| | | | | 251/121 |
| 6,271,486 | B1 * | 8/2001 | Franklin | F16K 3/03 |
| | | | | 251/212 |
| 11,015,721 | B2 * | 5/2021 | Sakizchi | F16K 3/14 |
| 2015/0083943 | A1 * | 3/2015 | Shah | E21B 33/062 |
| | | | | 251/1.3 |
| 2017/0292616 | A1 * | 10/2017 | Moens | F04C 29/124 |
| 2021/0180704 | A1 * | 6/2021 | Sakizchi | F16K 3/029 |
| 2021/0348689 | A1 * | 11/2021 | Mann, III | F16K 3/0254 |

* cited by examiner

FLOW CONTROL VALVE

BACKGROUND OF THE INVENTION

Field of the Invention

The invention relates to devices for regulating the flow parameters of the working medium and can be used in equipment for the gas, petroleum, chemical, energy, metallurgical and coal industries.

Description of the Related Art

The closest to the claimed invention in terms of a set of essential features is the known (RU 2682468, IPC F16K3/03, F16K 31/54, published on Feb. 2, 2019) flow control valve (hereinafter referred to as the regulator) containing an actuator, a housing with a control element having inlet and outlet nozzles with through openings and movable and fixed control teeth (throttling elements), where the control teeth are located along the outer part of the flow; all the teeth are made of a streamlined shape and end in a wedge, in which the size of the angle in section is defined as 360/n, where n is the number of movable teeth, the passage of the regulator is symmetrical in cross-section in the form of a multiprong star and configured to taper to the center in the process of blocking the flow.

SUMMARY

Attaining the technical result stated below in the known invention is impossible because of the tapering of the flow part due to the arrangement of the throttling elements. During the movement of the medium in any control mode, including in the "open" position, a change in the cross-sectional area of the flow occurs, which leads to a change in its characteristics even if this is not necessary at the moment. This results in a decrease in the flow rate characteristics of the regulator.

The objective (technical problem) that the present invention is aimed at solving is to reduce the cost of pumping.

The technical result attained in the implementation of the claimed invention consists in achieving optimal flow rate characteristics of the medium.

The specified technical result is attained due to the fact that there is a flow control valve containing an actuator and a housing with a control element having inlet and outlet nozzles with through openings of the same diameter and a central part located coaxially therewith between the nozzles with radially directed, longitudinally oriented throttling elements evenly located on its inner cylindrical surface: fixed ones—in the form of projections, each having the shape of a triangular tooth in cross-section, and movable throttling elements located between them, made in order to change the size of the through opening of the central part configured to enable radial (in the direction to/from the longitudinal axis of the control element) translational motion along the side walls (vertex faces) of fixed throttling elements, contacting them; where all throttling elements have a terminal part in the form of a triangular wedge with a vertex angle size of 360/n, where n is the number of movable throttling elements, the cross-section of the through opening of the central part of the control element in the "open" position of the regulator has the shape of a symmetrical multiprong star, and the inner diameter of the central part of the control element is larger than the inner diameter of any of the nozzles by an amount at which the area of any cross-section of the specified central part, taking into account the cross-sectional area of the throttling elements in the "open" position of the regulator, has a deviation from the cross-sectional area of the flow part of any of the nozzles of no more than 2%.

The flow value is regulated as the size of the through opening of the central part of the control element changes due to the radial displacement of the movable throttling elements between the "open" and "closed" positions of the regulator.

The cross-section of the through opening in the central part of the control element in the "open" position of the regulator is limited by the vertex faces (faces with a wedge-shaped vertex) of the throttling elements. In the process of regulating the flow value, the movable throttling elements move from the initial position (the "open" position of the regulator) until their vertex faces are completely closed on the longitudinal axis of the control element and their side faces are in full contact with the vertex faces of the fixed throttling elements within the central part of the control element (the "closed" position of the regulator).

An increase in the volume of the central part of the control element due to an increase in its inner diameter compensates for the volume occupied in this part by the throttling elements. As a result of such compensation, the cross-sectional area of the through opening at any point along the entire control zone (the central part of the control element) in the "open" position of the regulator remains the same or has minor (within 2%) deviations. At the same time, equal or very similar characteristics of the change in the shape and cross-sectional area of the through opening are achieved, which leads to optimization of the flow of the medium through the regulator in the "open" position to the characteristics of the medium flow in the pipe. In other words, in the open state, the throughput of the regulator is equal to (or differs by no more than 2% from) the throughput of the pipeline on which the regulator is installed.

These changes in the through opening, characterized by a throughput coefficient, allow the flow of the medium to retain exactly the same characteristics (volume and speed) both upstream and downstream the control element. Due to the absence of changes in the specified characteristics of the medium flow in the "open" position of the regulator, pumping costs are reduced many times over.

Depending on the actuator used, the regulator can be manufactured in both a control and an anti-surge design.

The claimed device is the only control device that fully meets the criterion of "axial symmetry".

BRIEF DESCRIPTION OF THE DRAWINGS

To clarify the essence of the claimed invention, the following graphic materials are presented:

DETAILED DESCRIPTION OF THE INVENTION

Figure 1:
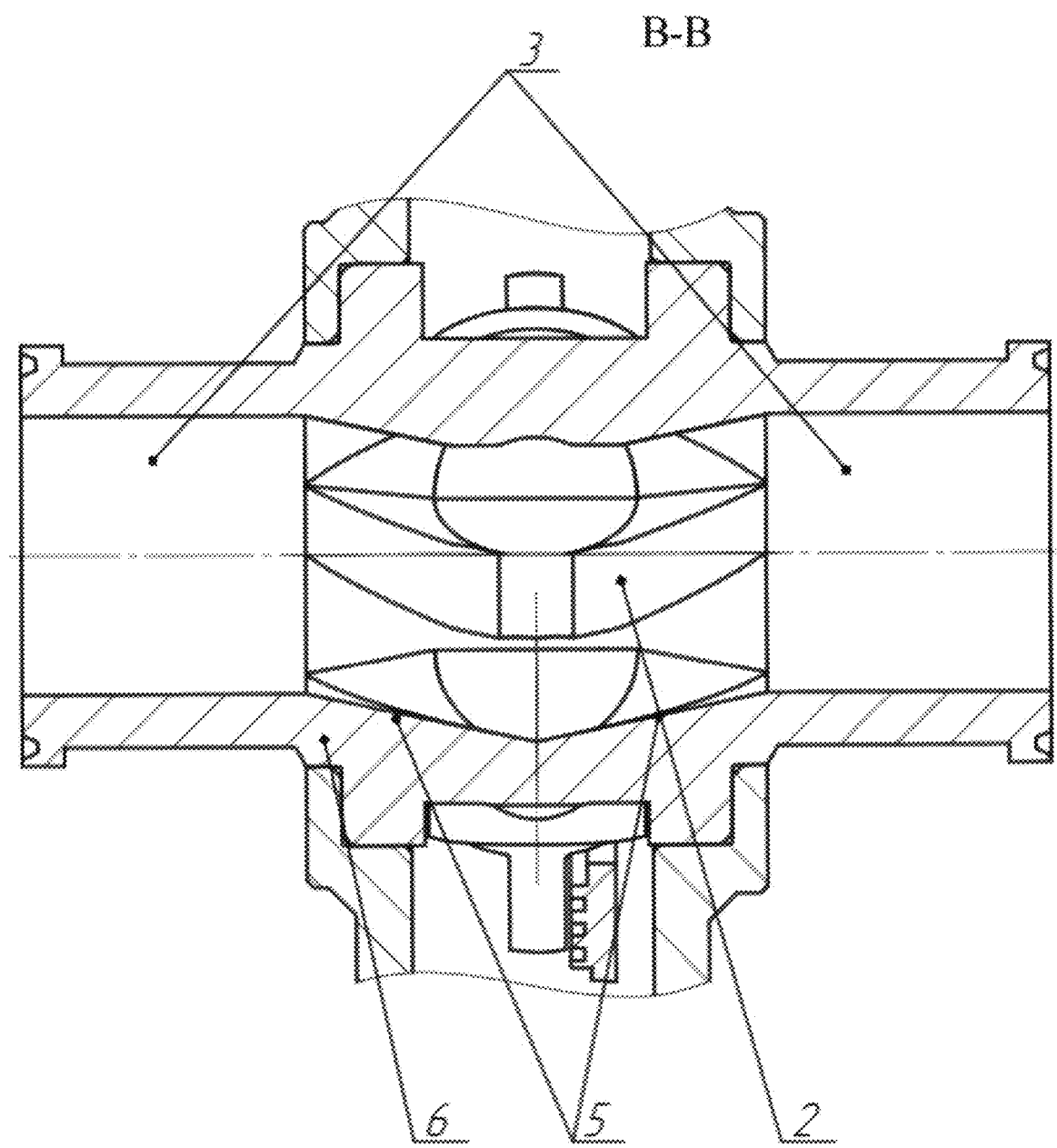
FIG. 1 is a longitudinal section of the regulator housing, with the through opening of the flow part in the "open" position of the regulator.

To prove the industrial implementation of the claimed invention, a description of a particular design of the flow control valve and the way of its functioning are presented.

The flow control valve contains an actuator (not shown) and a housing with control element 6 having inlet and outlet nozzles (3 and 4, respectively) of the same diameter D. In central part 5 of control element 6, six radially directed longitudinally oriented throttling elements (control teeth) are evenly arranged: fixed throttling elements 2 having the shape of a triangular tooth in cross section each, made in the form of protrusions on the inner cylindrical surface of central part 5 of control element 6; and movable throttling elements 1 located between them. All throttling elements 1 and 2 have a streamlined shape and end in a wedge, whose vertex angle in section is 120°.

Figure 2:
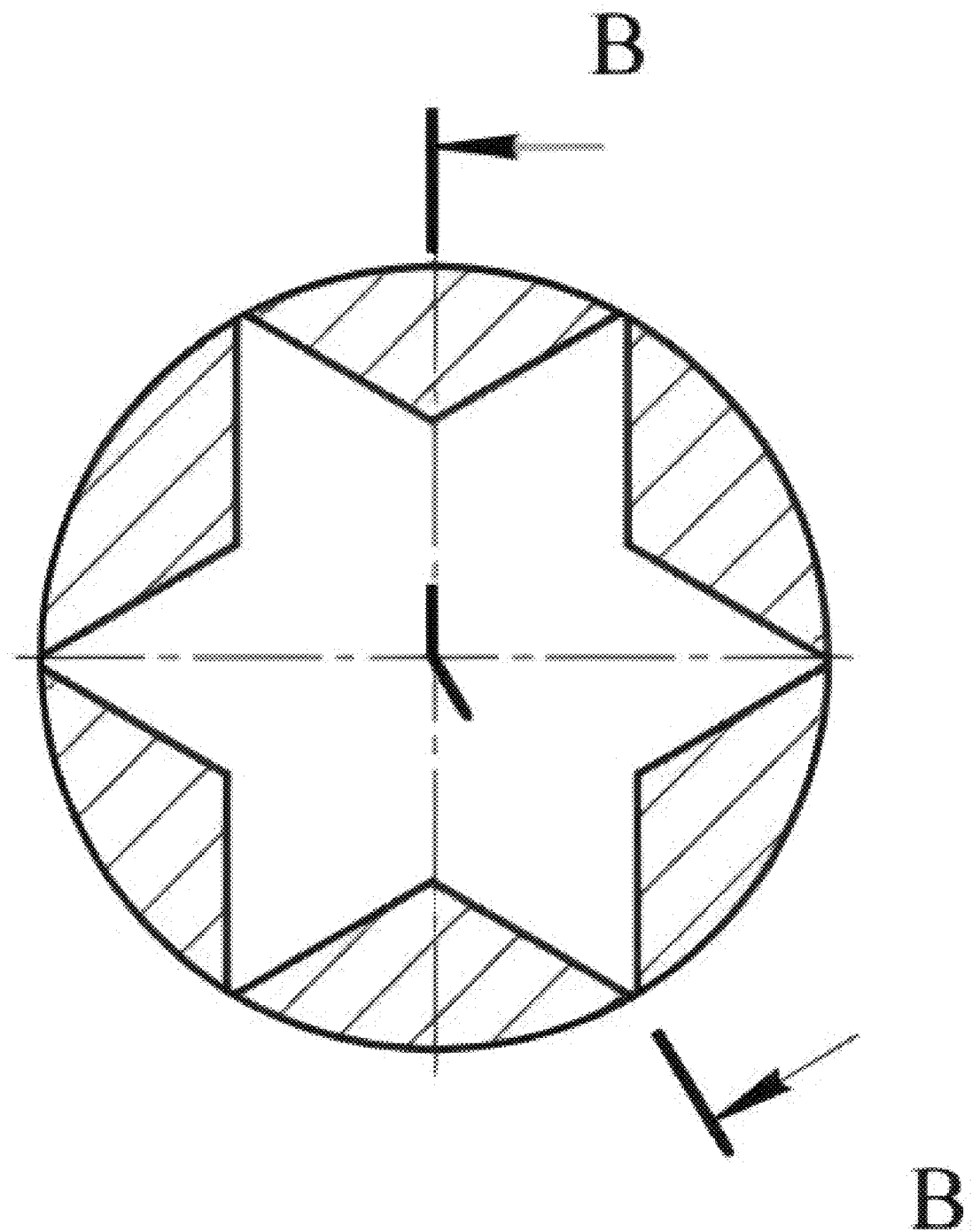
FIG. 2 is section B-B of the central part of the regulator, with the through hole of the flow part in the "open" position of the regulator.

The regulator is in the "open" position (FIG. 1,2) when the cross-section of the through hole of central part 5 of control element 6 has the shape of a symmetrical multiprong star with an even number of prongs (FIG. 2).

Figure 3:
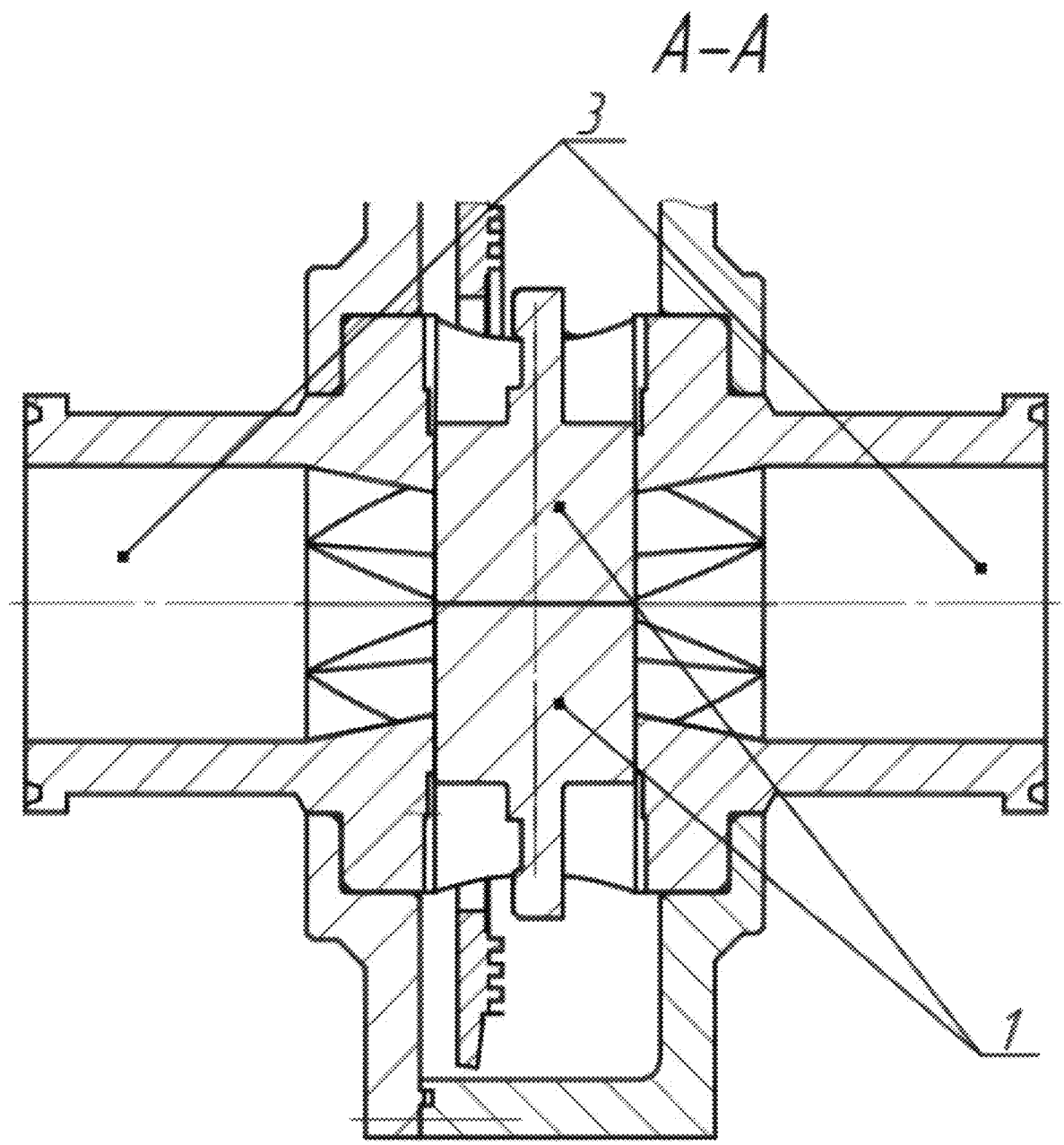
FIG. 3 is a longitudinal section of the central part of the regulator, with the through hole of the flow part in the "closed" position of the regulator.
Figure 4:
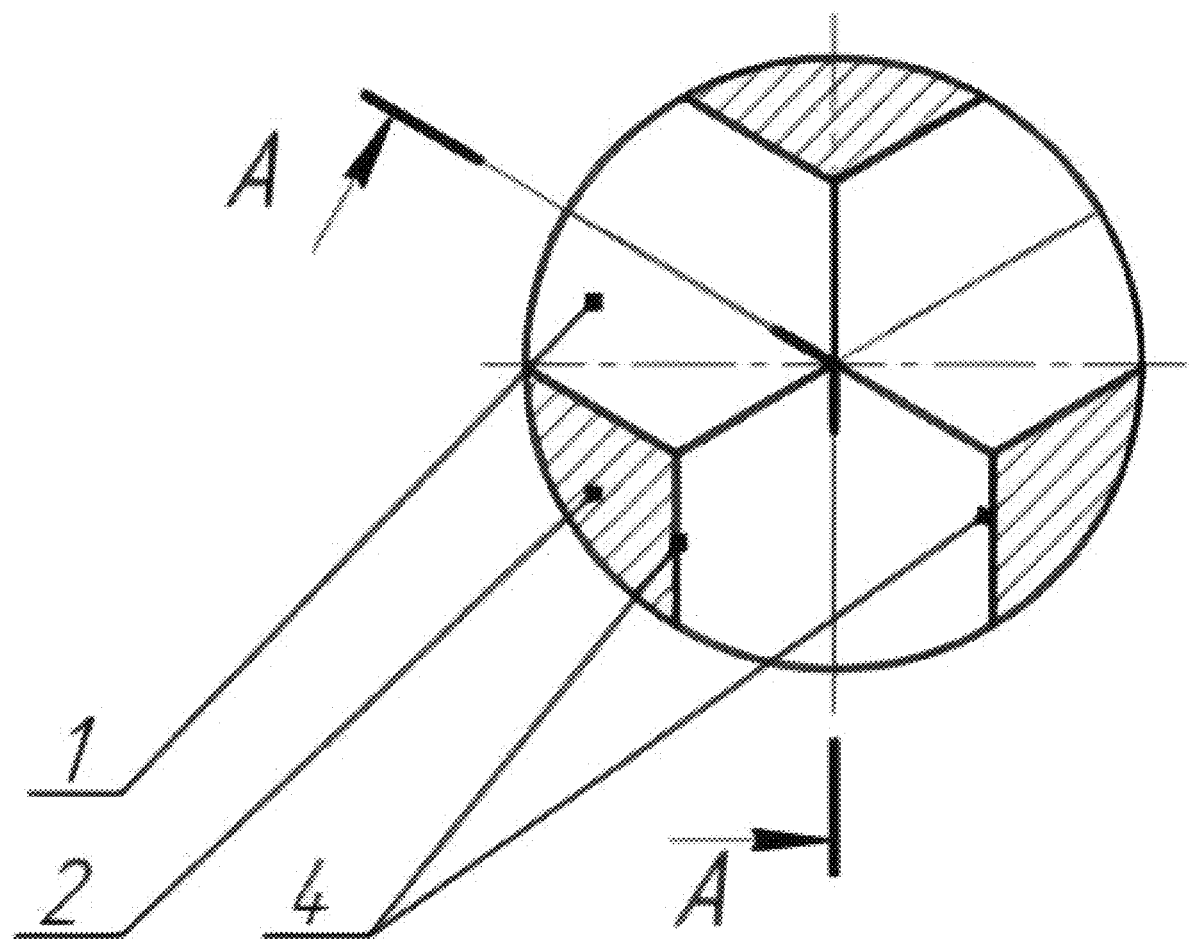
FIG. 4 is section A-A of the central part of the control element, with the through opening of the flow part in the "closed" position of the regulator.

The regulator is in the "closed" position (FIG. 3, 4) when the vertex faces of movable throttling elements 1 are closed with each other on the longitudinal axis of control element 6.

The inner diameter D1 of central part 5 of control element 6 is increased compared to the inner diameter D of nozzles 3 of the regulator by an amount at which the area of any cross-section of central part 5 of control element 6, taking into account the cross-sectional area of throttling elements 1, 2 in the "open" position of the regulator (FIG. 1, 2) is kept within +/−2% of the cross-sectional area of the flow part of any 3 (4) of the nozzles.

The flow value is regulated as the size of the through opening in central part 5 of control element 6 changes as a result of radial displacement of fixed throttling elements 2 along and in contact with the side walls (vertex faces) 4 of fixed throttling elements 2 in the direction to/from its longitudinal axis. The translational movement of movable throttling elements 1 is ensured by rotating the wheel of the regulator actuator and transmitting this movement through a gear system to the actuator disc, with which each of movable throttling elements 1 is engaged through a mating bar.

The invention claimed is:

1. A flow control valve, comprising:
an actuator; and
a housing with a control element having an inlet nozzle and an outlet nozzle, each nozzle defining a through opening of a same inner diameter (D), and a central part disposed coaxially between the nozzles, the central part having an inner cylindrical surface and defining a control zone,
wherein a plurality of fixed throttling elements are formed as projections on the inner cylindrical surface of the central part, each fixed throttling element having, in cross-section, a shape of a triangular tooth terminating in a wedge with two planar wedge faces,
wherein a plurality of movable throttling elements are located between the fixed throttling elements, each movable throttling element having, in cross-section, the shape of a triangular tooth terminating in a wedge with two planar wedge faces, and each movable throttling element being constrained for radial, translational motion toward and away from a longitudinal axis of the control element while sliding in continuous face-to-face contact along side faces of adjacent fixed throttling elements,
wherein, in an open position, a through opening of the control zone is bounded by the wedge faces of the throttling elements and has a cross-sectional shape of a symmetrical multiprong star having an even number of prongs, and the inner diameter (D1) of the central part exceeds D by an amount selected such that, along substantially the entire axial length of the control zone in the open position, an area of the through opening, accounting for cross-sectional area occupied by the throttling elements, deviates by no more than ±2% from a cross-sectional flow area of either nozzle,
wherein each throttling element has a wedge vertex angle of 360/n degrees, n being the number of the movable throttling elements, and
wherein, in a closed position, wedge vertices of the movable throttling elements meet at the longitudinal axis and side faces of the movable throttling elements are in surface contact with the wedge faces of the fixed throttling elements to block the through opening within the control zone.

* * * * *